United States Patent
Hsieh

(10) Patent No.: US 8,261,106 B2
(45) Date of Patent: Sep. 4, 2012

(54) SYSTEM FOR CONTROLLING POWER OF A PORTABLE ELECTRONIC DEVICE USING LOCK CODE

(75) Inventor: Hsing-Yuan Hsieh, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 391 days.

(21) Appl. No.: 12/634,798

(22) Filed: Dec. 10, 2009

(65) Prior Publication Data

US 2011/0004772 A1   Jan. 6, 2011

(30) Foreign Application Priority Data

Jul. 3, 2009   (CN) .......................... 2009 1 0303987

(51) Int. Cl.
*G06F 1/00*   (2006.01)
*H04M 1/66*   (2006.01)
*H04M 3/16*   (2006.01)

(52) U.S. Cl. ......... 713/300; 455/410; 455/411; 455/419

(58) Field of Classification Search .................. 713/300; 455/410, 411, 419
See application file for complete search history.

(56) References Cited

U.S. PATENT DOCUMENTS

| | | | | |
|---|---|---|---|---|
| 5,734,978 | A * | 3/1998 | Hayatake et al. | 455/410 |
| 6,011,473 | A * | 1/2000 | Klein | 340/571 |
| 6,081,096 | A * | 6/2000 | Barkat et al. | 320/124 |
| 6,397,088 | B1 * | 5/2002 | Roo | 455/572 |
| 6,741,851 | B1 * | 5/2004 | Lee et al. | 455/410 |
| 7,099,699 | B2 * | 8/2006 | Jeong | 455/565 |
| 7,272,383 | B2 * | 9/2007 | Jung | 455/411 |
| 2002/0058497 | A1 * | 5/2002 | Jeong | 455/410 |
| 2005/0035659 | A1 * | 2/2005 | Hahn et al. | 307/10.2 |
| 2006/0234679 | A1 * | 10/2006 | Matsumoto et al. | 455/411 |
| 2008/0001740 | A1 * | 1/2008 | Liu et al. | 340/568.1 |
| 2008/0064387 | A1 * | 3/2008 | Koncelik | 455/425 |
| 2008/0220744 | A1 * | 9/2008 | Rydgren et al. | 455/411 |
| 2009/0100526 | A1 * | 4/2009 | Lee | 726/26 |
| 2010/0162368 | A1 * | 6/2010 | Aissi et al. | 726/5 |
| 2010/0273449 | A1 * | 10/2010 | Kaplan | 455/411 |

* cited by examiner

*Primary Examiner* — Vincent Tran

(74) *Attorney, Agent, or Firm* — Altis Law Group, Inc.

(57) ABSTRACT

A portable electronic device includes a main power supply, a power management unit (PMU) connected to the main power supply, and a receiver unit connected to the PMU. The main power supply supplies electric power to the portable electronic device through the PMU. The receiver unit includes a processor module connected to the PMU. The processor module stores a lock code, the processor module directs the PMU to prevent the main power supply from providing electric power to the portable electronic device when the receiver unit receives wireless signals corresponding to the lock code.

7 Claims, 2 Drawing Sheets

US 8,261,106 B2

SYSTEM FOR CONTROLLING POWER OF A PORTABLE ELECTRONIC DEVICE USING LOCK CODE

BACKGROUND

1. Technical Field

The present disclosure relates to portable electronic devices and methods for using the same, and particularly to a portable electronic device capable of protecting private information and a method for using the same.

2. Description of Related Art

Currently, portable electronic devices, such as mobile phones, digital cameras, and personal digital assistants (PDA), are widely used. Such portable electronic devices are easily stolen or lost due to their small sizes. As a result, personal identification number (PIN) codes are often stored in many portable electronic devices to prevent unauthorized access to any private data contained within the device. When a portable electronic device storing a predetermined PIN code is actuated, the portable electronic device cannot be activated until the PIN code is input. Thus, information stored in the portable electronic device is protected.

However, the PIN code must be input into the portable electronic device upon initiation of every operation thereof, complicating operation.

Therefore, there is room for improvement within the art.

BRIEF DESCRIPTION OF THE DRAWINGS

Many aspects of the present portable electronic device and method for using the same can be better understood with reference to the following drawings. The components in the various drawings are not necessarily drawn to scale, the emphasis instead being placed upon clearly illustrating the principles of the present portable electronic device and method for using the same. Moreover, in the drawings, like reference numerals designate corresponding parts throughout the figures.

DETAILED DESCRIPTION

Figure 1:
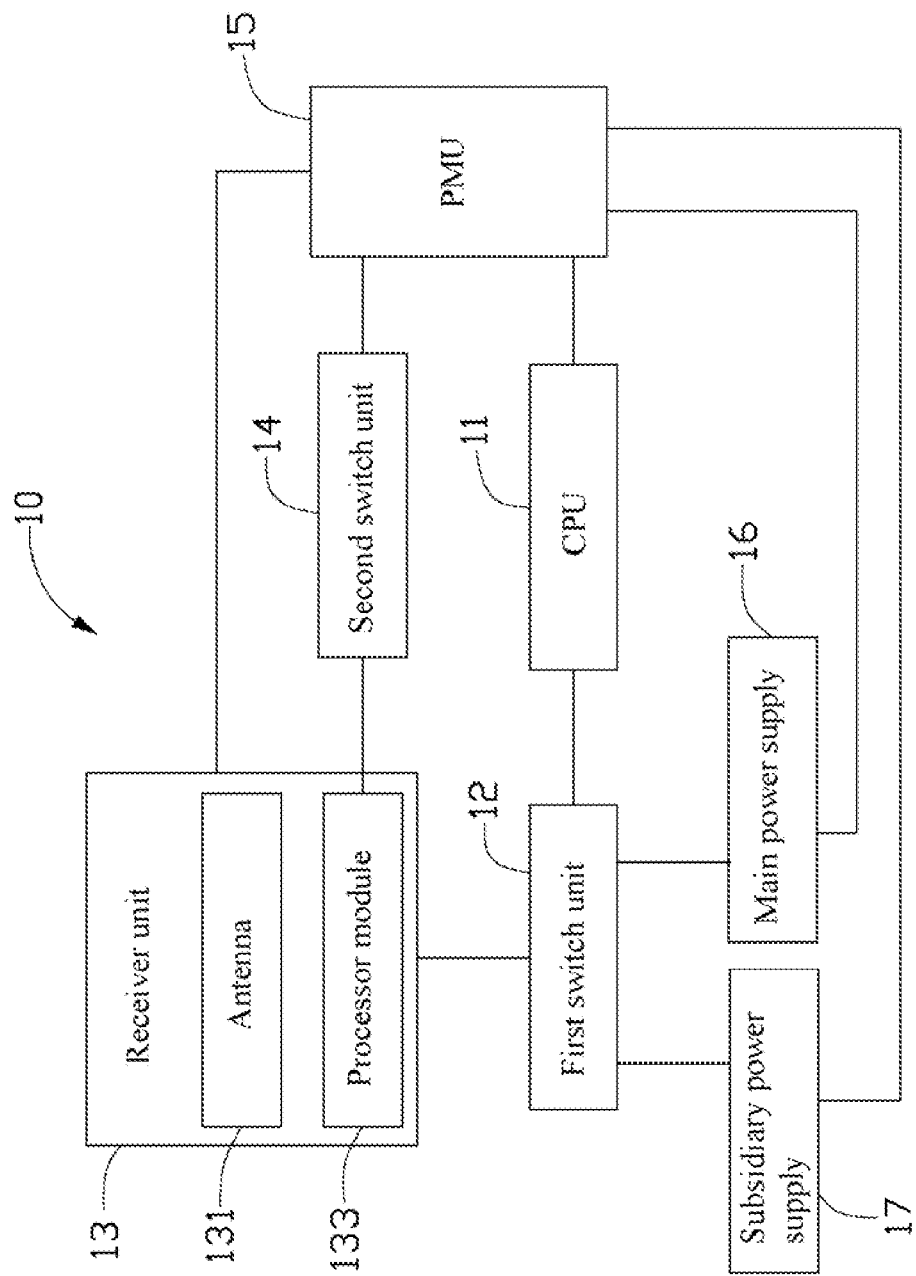
FIG. 1 is a block diagram of a portable electronic device, according to an exemplary embodiment.

FIG. 1 shows a portable electronic device 10 according to an exemplary embodiment. The portable electronic device 10 can be a mobile phone, a digital camera, a personal digital assistant (PDA), etc. The electronic device 100 includes a central processing unit (CPU) 11, a first switch unit 12, a standby receiver unit 13, a second switch unit 14, a power management unit (PMU) 15, a main power supply 16, and a subsidiary power supply 17.

Both the main power supply 16 and the subsidiary power supply 17 can be conventional batteries mounted in the portable electronic device 10. The main power supply 16 can be detached from the portable electronic device 10, and the subsidiary power supply 17 is permanently secured in the portable electronic device 10. The main power supply 16 and the subsidiary power supply 17 are both electrically connected to the first switch unit 12, and the first switch unit 12 is electrically connected to the receiver unit 13. The CPU 11 is electrically connected to the first switch unit 12. In use, the CPU 11 can direct the first switch unit 12 to select either the main power supply 16 or the subsidiary power supply 17, and can also shut off the first switch unit 12.

The receiver unit 13 includes an antenna 131 and a processor module 133 electrically connected to the antenna 131. The processor module 133 is electrically connected to the PMU 15 through the second switch unit 14. In use, the processor module 133 can direct the PMU 15 through the second switch unit 14, thereby preventing or allowing the main power supply 16 to supply electric power to the portable electronic device 10. The main power supply 16 and the subsidiary power supply 17 are both electrically connected to the PMU 15. The PMU 15 is electrically connected to the CPU 11 and the receiver unit 13, and can also be electrically connected to any other components (not shown) of the portable electronic device 10. In use, the main power supply 16 can supply electric power to the CPU 11, the receiver unit 13, and other components of the portable electronic device 10 through the PMU 15. The subsidiary power supply 17 can only supply electric power to the CPU 11 through the PMU 15 and supply electric power to the receiver unit 13 through the first switch unit 12.

When the portable electronic device 10 is turned on and being normally used, the main power supply 16 supplies electric power to the receiver unit 13 through the PMU 15, and also supplies electric power to the CPU 11 and other components of the portable electronic device 10. The CPU 11 shuts off the first switch unit 12. When the portable electronic device 10 is turned off by conventional methods (i.e., is not turned off in response to the lock code), the PMU 15 interrupts the electric connections between the main power supply 16 and the receiver unit 13 or other components of the portable electronic device 10, and allows only the main power supply 16 to supply electric power to the CPU 11 and the receiver unit 13. Thus, the CPU 11 directs the first switch unit 12 to connect the main power supply 16 with the receiver unit 13, thereby still using the main power supply 16 to supply electric power to the receiver unit 13. When the main power supply 16 is prevented from supplying electric power to the portable electronic device 10, if the electric power of the main power supply 16 becomes exhausted, or the main power supply 16 is removed from the portable electronic device 10, the subsidiary power supply 17 supplies electric power to the CPU 11 through the PMU 15. The CPU 11 directs the first switch unit 12 to connect the subsidiary power supply 17 with the receiver unit 13 to supply electric power to the receiver unit 13.

Figure 2:
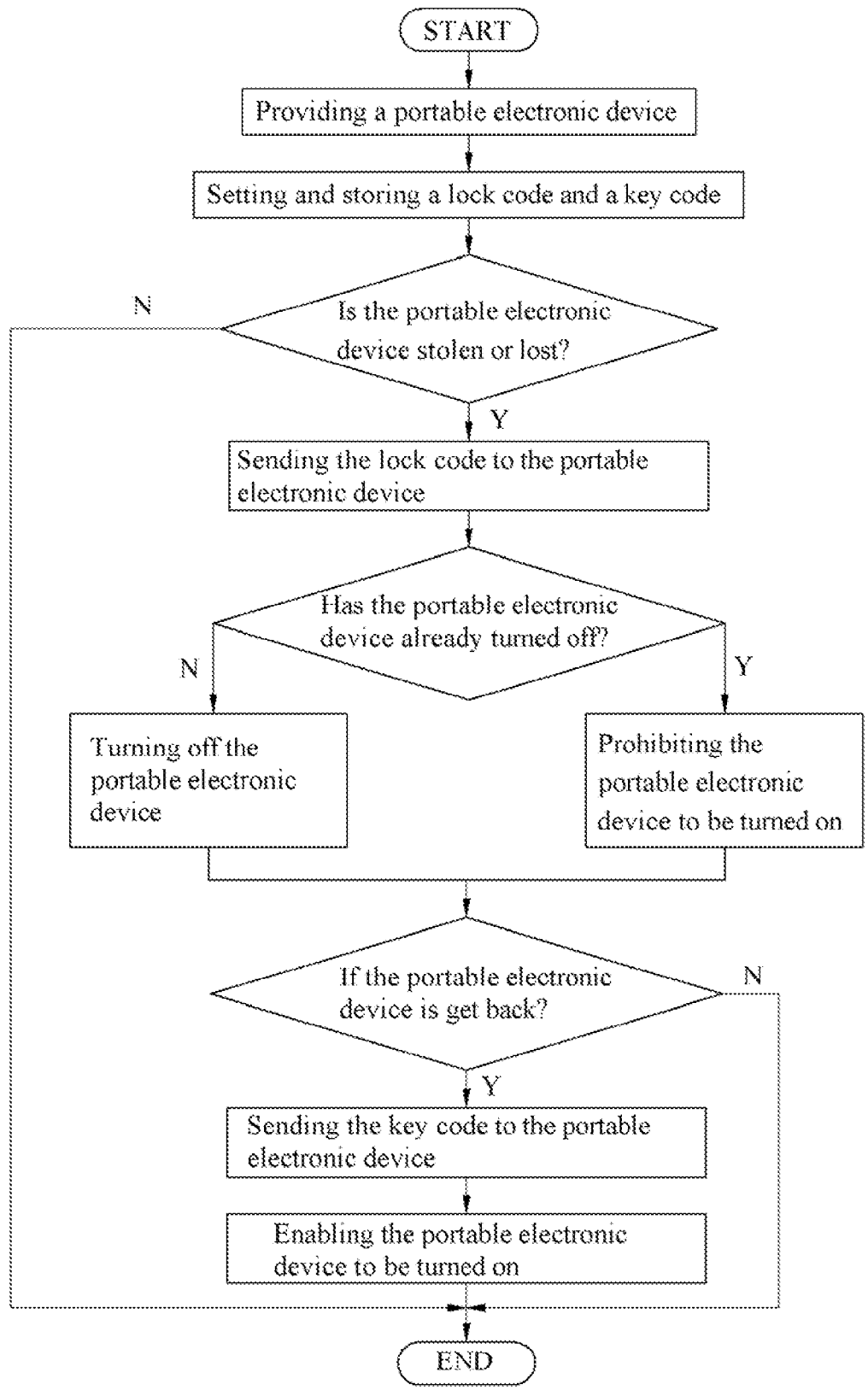
FIG. 2 is a flowchart of a method for using a portable electronic device such as, for example, that of FIG. 1.

Also referring to FIG. 2, a method for using a portable electronic device is provided.

A portable electronic device 10, such as that of FIG. 1 is provided. The portable electronic device 10 is turned on, and a lock code and a key code are set and stored in the processor module 133. Use of the portable electronic device 10 is enabled.

If the portable electronic device 10 is lost or stolen, the lock code can be sent as wireless signals by conventional wireless communication methods such as GSM or CDMA wireless communication.

When the antenna 131 receives the wireless signals corresponding to the lock code, the antenna 131 transmits the received signals to the processor module 133. The processor module 133 decodes the received signals to convert the received signals into code, and then compares the received code with the stored lock codes. If the received code corresponds to the stored lock code, the processor module 133 automatically turns off the portable electronic device 10. Particularly, the processor module 133 directs the PMU 15 through the second switch unit 14 to prevent the main power supply 16 from supplying electric power to any other components of the portable electronic device 10. Thus, the portable electronic device 10 can be automatically turned off, and cannot be turned on by any operation thereon. If the portable electronic device 10 has already been turned off by conventional methods when it receives the wireless signals corresponding to the key code, the portable electronic device 10 is kept turned off. Since the main power supply 16 is prevented from supplying electric power to the portable electronic device 10, the portable electronic device 10 cannot be turned on by any operation thereon, either. Therefore, the thief or the finder of a lost device cannot use the portable electronic device 10, and cannot access any private information stored in the portable electronic device 10.

As above detailed, when the main power supply 16 is prevented from supplying electric power to the portable electronic device 10, the subsidiary power supply 17 supplies electric power to the CPU 11 and the receiver unit 13. Thus, the receiver 13 can still receive wireless signals and direct the PMU 15. If the owner gets back the portable electronic device 10, the owner can send the key code as wireless signals by conventional wireless communication methods. When the antenna 131 receives a wireless signal corresponding to the stored key code, the antenna 131 transmits the received signals to the processor module 133. The processor module 133 decodes the received signals to transform the received signals into code, and then compares the received code with the stored key code. If the received code corresponds to the stored key code, the processor module 133 directs the PMU 15 to allow the main power supply 16 to supply electric power to any other components of the portable electronic device 107. Thus, operation of the portable electronic device 10 is enabled.

In the present disclosure, after the lock code is sent, despite the portable electronic device 10 being turned off or the main power supply 16 removed, the receiver unit 13 can still receive the wireless signals corresponding to the lock code. When receiving the lock code, the portable electronic device 10 is automatically turned off or remains turned off, and cannot be turned on until receiving the key code. Therefore, the portable electronic device 10 can protect private information stored therein. In each general actuating operation of the portable electronic device 10, the owner needs not to input any code into the portable electronic device 10. Compared with the conventional information protecting methods, the present method is simplified.

Additionally, the CPU 11 or the processor module 133 can direct the PMU 15 to electrically connect the subsidiary power supply 17 to the main power supply 16. When the electric power of the subsidiary power supply 17 is exhausted, the main power supply 16 can be used to charge the subsidiary power supply 17 through the PMU 15. Thus, the receiver unit 13 does not stop working unless electric power of both the main power supply 16 and the subsidiary power supply 17 are exhausted.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A portable electronic device, comprising:
   a main power supply;
   a power management unit (PMU) connected to the main power supply, through which the main power supply provides electric power to the portable electronic device; and
   a receiver unit connected to the PMU, the receiver unit including a processor module connected to the PMU;
   a subsidiary power supply;
   a central processing unit (CPU); and
   a first switch unit connected to the CPU;
   wherein both the main power supply and the subsidiary power supply are connected to the receiver unit by the first switch unit, and the CPU directs the first switch unit to select either the main power supply or the subsidiary power supply to supply electric power to the receiver unit; and
   wherein the processor module stores a lock code, and the processor module directs the PMU to prevent the main power supply from providing electric power to the portable electronic device when the receiver unit receives wireless signals corresponding to the lock code.

2. The portable electronic device as claimed in claim 1, wherein:
   when the portable electronic device is turned on, the CPU shuts off the switch unit and the main power supply supplies electric power to the receiver unit through the PMU;
   when the portable electronic device receives no lock code and is turned off, the CPU directs the first switch unit to connect the main power supply with the receiver unit and the main power supply supplies electric power to the receiver unit through the first switch unit; and
   when the main power supply is prevented from supplying electric power to the portable electronic device, or when the electric power of the main power supply is exhausted, or when the main power supply is removed, the CPU directs the first switch unit to connect the subsidiary power supply with the receiver unit and the subsidiary power supply supplies electric power to the receiver unit through the first switch unit.

3. The portable electronic device as claimed in claim 1, wherein the CPU is connected to the PMU, and the main power supply or the subsidiary power supply can supply electric power to the CPU through the PMU.

4. The portable electronic device as claimed in claim 3, wherein:
   when the portable electronic device receives no lock code, the main power supply supplies electric power to the CPU; and
   when the main power supply is prevented from supplying electric power to the portable electronic device, or when the electric power of the main power supply is exhausted, or when the main power supply is removed, the subsidiary power supply supplies electric power to the CPU.

5. The portable electronic device as claimed in claim 1, further comprising a second switch unit, by which the processor module is connected to and controls the PMU.

6. The portable electronic device as claimed in claim 1, wherein the receiver unit further includes an antenna connected to the processor module.

7. The portable electronic device as claimed in claim 1, wherein the processor module further stores a key code, when the receiver unit receives wireless signals corresponding to which the processor module directs the PMU to allow the main power supply to provide electric power to the portable electronic device.

* * * * *